Sept. 10, 1929.   J. FLAWS, JR   1,728,048
METHOD OF AND APPARATUS FOR MOUNTING FILAMENTS
Filed March 11, 1927   4 Sheets-Sheet 1

Inventor:
John Flaws, Jr.
by *Alexander F. Lunt*
His Attorney.

Sept. 10, 1929.  J. FLAWS, JR  1,728,048
METHOD OF AND APPARATUS FOR MOUNTING FILAMENTS
Filed March 11, 1927  4 Sheets-Sheet 2

Fig.10.

Inventor:
John Flaws, Jr
by
His Attorney.

Sept. 10, 1929. J. FLAWS, JR 1,728,048
METHOD OF AND APPARATUS FOR MOUNTING FILAMENTS
Filed March 11, 1927 4 Sheets-Sheet 4

Inventor:
John Flaws, Jr.
by
His Attorney.

Patented Sept. 10, 1929.

1,728,048

UNITED STATES PATENT OFFICE.

JOHN FLAWS, JR., OF WEST ORANGE, NEW JERSEY, ASSIGNOR TO GENERAL ELECTRIC COMPANY, A CORPORATION OF NEW YORK.

METHOD OF AND APPARATUS FOR MOUNTING FILAMENTS.

Application filed March 11, 1927. Serial No. 174,628.

My invention relates to the making of filaments composed of a wire of refractory metal, such as tungsten, firmly joined at each end to a lead consisting of a length of heavier wire of nickel or similar metal, and more particularly to the making of straight tungsten filaments connected at each end to a heavy lead of nickel and useful in thermionic devices.

In some types of thermionic devices the cathode or filament is a small straight wire of tungsten slightly over an inch long, joined to heavy end leads of nickel. The filaments are all subjected to the same voltage for heating them, and slight variation in the distance between the heavy leads connected to the ends of the filament, with a corresponding variation in the exposed length of filament, makes a considerable variation in the temperature of the filament when operated at that voltage, so that all the filaments should have practically the same exposed length. These filaments have heretofore been mounted on the heavy leads by hand, an operation requiring skill on the part of the operators, and a considerable variation in the exposed length of the filament occurred in spite of all reasonable care taken by the operators.

One object of my invention is to provide an improved method of making such filaments with the heavy leads spaced more accurately and uniformly than is feasible by hand work so that the exposed lengths of the filaments are more uniform. A further object is to so facilitate the making of such filaments that the speed of manufacture is greatly increased. A still further object of my invention is to provide an automatic machine which will manufacture such filaments with the leads accurately spaced to make the exposed length of all filaments substantially the same. Other objects and advantages of my invention will appear from the following specification, and its novel features will be pointed out more particularly in the appended claims.

In accordance with my invention the ends of long lead wires are definitely positioned at a definite and predetermined distance apart, a filament somewhat longer than the distance between the ends of the leads is so placed that its ends overlap the ends of the leads, and then is fastened to the leads by being clamped or pinched into them, after which the lead wires are cut to form leads of the proper length. In this way I produce a filament which is of definite exposed length and which is firmly secured at the ends to heavy leads. In the machine which I prefer to use for carrying out this method of making filaments the ends of long lead wires wound on spools are automatically spaced a predetermined distance apart by means of reciprocating heads constructed to approach each other, carrying along with them the lead wires until the ends of the lead wires are the proper distance apart and then to retreat, leaving the ends of the lead wires accurately positioned and at a predetermined distance apart. From a long filament wire wound on a spool a filament of definite length is drawn off by a reciprocating wire puller or gripper which seizes the projecting end of the filament wire and pulls it thru a pair of shears until the proper length extends beyond the shears, which then close automatically and cut the filament wire to produce a filament of definite length. The filament is automatically seized by a bodily movable filament carrier, which carries the filament into place where its ends rest on and overlap the ends of the lead wires. While the filament is held in place clamping jaws are automatically operated to pinch or clamp the ends of the filament into the ends of the lead wires, after which automatically actuated shears cut the lead wires some distance back of their ends joined to the filament. The result of these operations, all carried out automatically and in a definite sequence, is a filament of definite exposed length fastened to a lead at each end.

My invention will be best understood in connection with the accompanying drawings, in which, merely for purposes of illustration, I have indicated diagrammatically the principal steps of my novel process of making a filament and have also shown one form of automatic machine suitable for carrying out this process, and in which Figures 1 to 8 inclusive show diagrammatically the principal steps in making the filament, Figure 18 a side view of the lead wire clutch, and Figure 19 a plan view of Figure 18.

Figure 3:
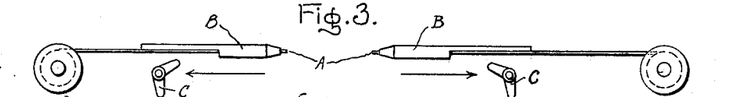
Figure 4:
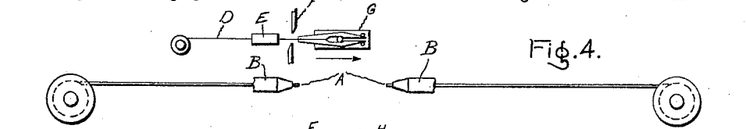

The principal steps in making a filament in accordance with my invention, particularly by the automatic machine shown in Figures 10 to 19, are illustrated diagrammatically in Figures 1 to 8 inclusive. Two long lead wires A preferably of nickel and somewhat flattened are guided so that their end portions are in alignment with each other and are fed toward each other until their inner or free ends are in definite relation and at a definite distance apart. The lead wires may be fed forward automatically by reciprocating guides B in alignment with each other and constructed to grip the lead wire by some means, such as a pawl C and move it forward as the heads advance from the positions indicated in Figure 1 to the positions indicated in Figure 2, and to release the lead wire as shown in Figure 3, before the heads retreat, so that the ends of the lead wires remain properly spaced and positioned.

Figure 5:
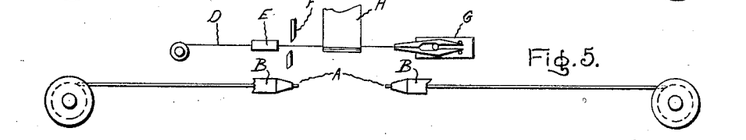
Figure 6:
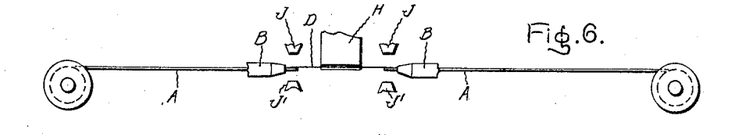
Figure 7:
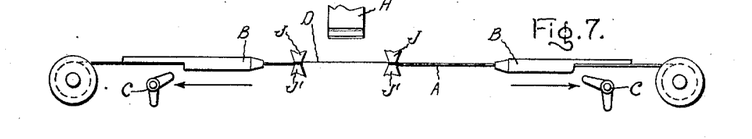
Figure 8:
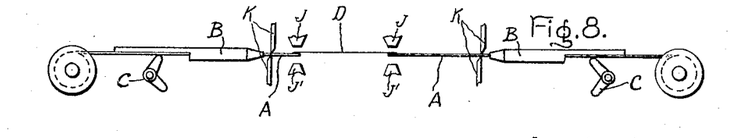
Figure 9:
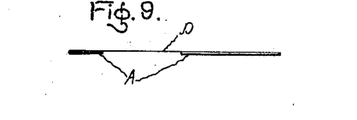
Figure 9 shows the finished filament.

A filament is obtained from a long filament wire D drawn off a spool thru a combined guide and tension device E and thru a filament cutter F by a reciprocating filament puller or gripper G, so constructed that it approaches the end of the filament wire D projecting from the guide E, automatically seizes it and retreats pulling the filament wire thru the device E until a definite length of wire projects beyond the cutter F, as indicated in Figure 5. While the puller G still has hold of the end of the filament wire a filament carrier H bodily movable toward and away from the positioned lead wires A, seizes the filament wire D between the puller G and the filament cutting blades F, also as indicated in Figure 5, and thereupon the filament cutter F closes and cuts the filament wire D leaving in the carrier H a straight filament somewhat longer than the distance between the ends of the lead wires A. The filament puller G now releases the end of the filament, and the carrier H moves forward bodily to place the filament in position where it bridges the gap between the ends of the previously positioned lead wires, with its ends overlapping the ends of the lead wires to a slight extent, as indicated in Figure 6. The overlapping ends of the filament and of the lead wires are now within range of two pairs of clamping jaws J and J', which close, as indicated in Figure 7, and clamp the ends of the filament wire into the lead wires A, after which the filament carrier H releases the filament and retreats as indicated in Figure 7, thereby leaving the filament free. While the clamping jaws J J' are closed, as indicated in Figure 7 and the ends of the lead wires are firmly held, the lead wire heads B may retreat or be moved back from the forward position shown in Figure 2 to their initial position shown in Figure 1, where they are out of the way, so that, as indicated in Fig. 8, lead wire cutters K may be actuated to cut the lead wires to form short leads secured to the ends of the filament. The finished filament shown in Figure 9 is discharged from the machine when the clamping jaws open, and thereupon the cycle of operations just described may be repeated.

Figure 10:
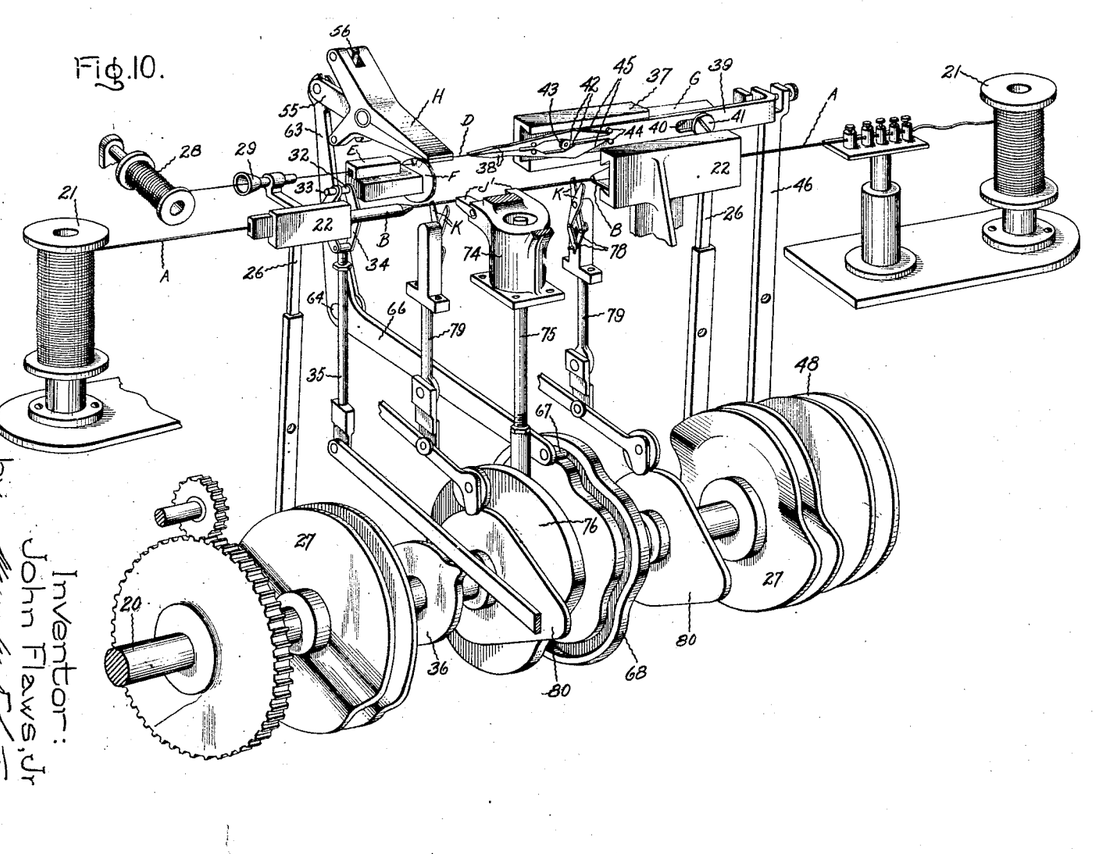
Figure 10 is a view partly in perspective, with various parts broken away and omitted, of one form of machine constructed in accordance with my invention.

The method of the filament making just described, and illustrated diagrammatically by Figures 1 to 8 inclusive, may conveniently be carried out automatically by means of the machine shown in perspective skeleton view in Figure 10, in which many of the parts of the machine are omitted in order to show more clearly the principal mechanisms which cooperate in making the filament, and which are actuated in proper sequence from a driving shaft 20 which carries the actuating cams for the various mechanisms.

Figures 18, 19:
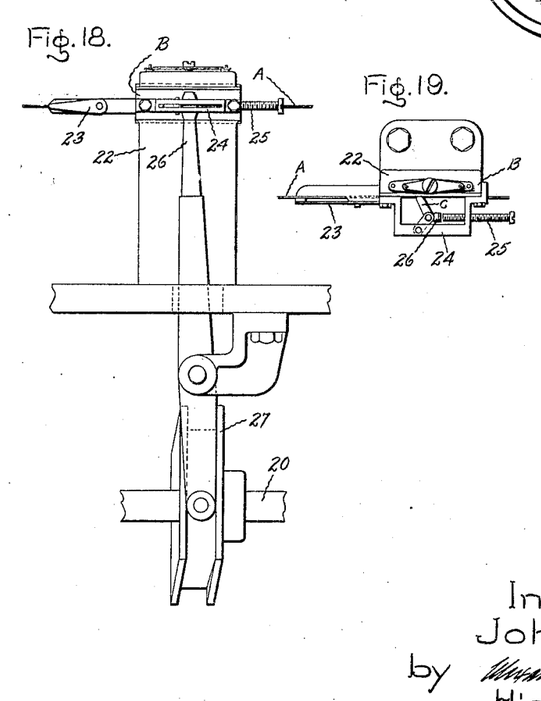

In the particular machine illustrated the long lead wires A on spools 21 are fed forward and are positioned by a lead positioning mechanism comprising reciprocating lead wire heads B mounted in grooved guides or standards 22 to be in alignment with each other. As best shown in Figures 18 and 19, each lead wire head B has a longitudinal groove for the lead wire A and a spring finger 23 for holding the lead wire in the groove with a light tension which permits the spring finger to slide over the lead wire as the head moves backward. Each head has a bracket 24 on which a toggle pawl C is pivoted so that its free end may enter the groove in the head B and clamp the lead wire firmly to the head during its forward movement. Each bracket has an adjusting screw 25, between the inner end of which and the pawl C is the end of an actuating lever 26 pivoted to the frame of the machine and actuated by a lead wire feed cam 27 mounted on the cam shaft 20. The cams 27 are so placed on the cam shaft that during each revolution of the cam shaft the heads B move from their outermost position indicated in Figure 1 toward each other into the position indicated in Figure 2, carrying the lead wires A with them, and then, at some other point during the revolution of the cam shaft the lead wires are released, as indicated in Fig.

Figure 1:
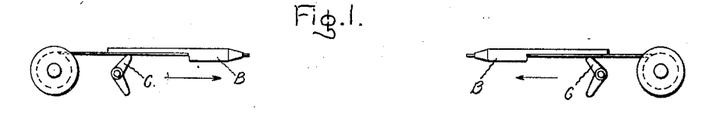
Figure 2:
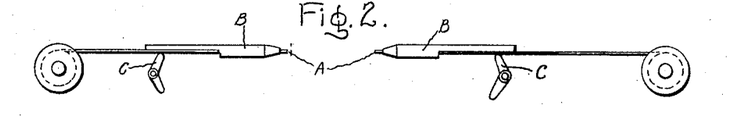

3, and the two heads B retreat to their initial or outermost position, as indicated in Figure 1. The actuating lever 26 presses on the joint of the toggle pawl during the forward movement of the head, thereby clamping the lead wire to the head and driving the head through the pawl, and releases the pawl and presses on the end of the screw 25 during the backward movement of the head, thereby leaving the pawl C free to slide over the lead wire as the head B moves backward. As a result the lead wire positioning mechanism automatically positions the lead wires with their ends a predetermined distance apart and in alignment in the position into which they were carried by the forward movement of the heads B.

Figure 16:
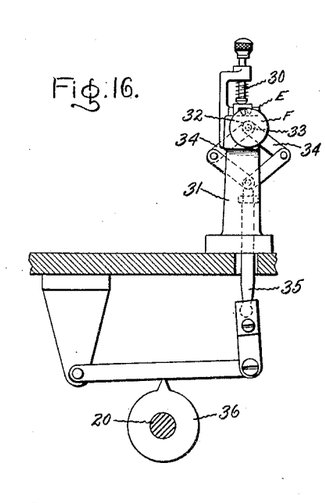
Figure 16 is a side view of the filament wire cutter.

The filament mechanism cuts a filament of predetermined length from a long wire, and carries it into juxtaposition with the previously positioned leads to which it is secured by a filament fastener. The filament of predetermined length is preferably obtained from a long wire, usually of drawn tungsten, on a spool 28 by a filament forming device comprising means for feeding the wire thru a funnel 29 and thence thru a guiding and tension device E, which may put tension on the wire by a pad of some soft material pressed down upon the tungsten wire by a resilient presser 30. The filament wire D as it emerges from the guide E passes thru a filament wire cutter F, having two blades conveniently made in the form of discs, each with a notch in the periphery, and mounted to rotate about a common axis. Sharp edges of the notches cut the filament wire when the discs are rotated to cause the notches to move out of registry. The filament wire cutting blades are rotatably journalled in a bearing block 31 on two shafts 32 and 33, one of which is tubular and constitutes a bearing for the other which extends through the bore of the tubular shaft. The filament wire cutting discs are rotated thru toggle levers 34 actuated thru a link 35 from a cam 36 on the cam shaft 20. As best shown in Figure 16, these toggle levers are so arranged that the two shafts 32 and 33 rock in opposite directions as the link 35 moves upward, causing the two notches in the filament cutting discs F to move out of registry and thereby cut the wire.

Figure 11:
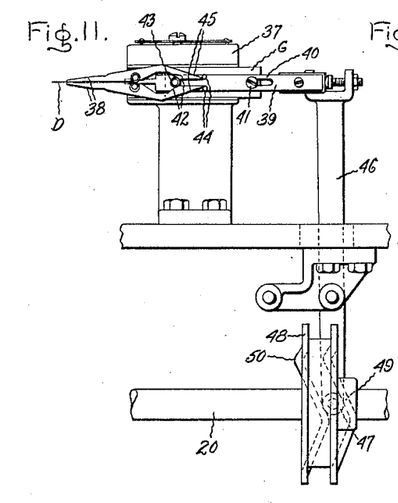
Figures 11 and 12 are side views of the filament wire puller in different positions.
Figure 12:
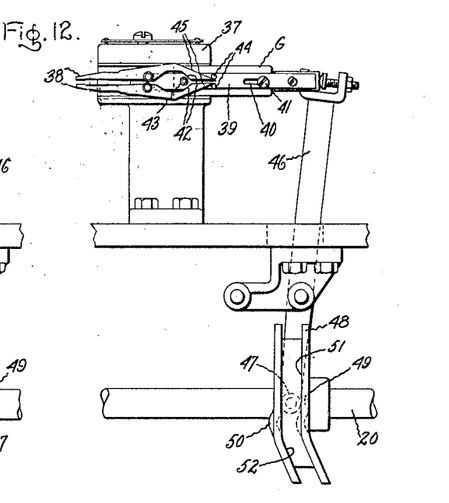

The amount of wire necessary to make a filament is measured off by that part of the filament mechanism comprising a reciprocating wire puller or head G mounted to slide in a standard 37 and carrying a pair of pivoted gripping jaws 38 controlled by an actuating slide 39 slidably mounted in a groove on the head G to have a movement on the head limited in extent by a slot 40 in which is a set screw 41 seated in the slide G. The filament gripping jaws are closed by closing inclines 42 formed on the handles of the gripping jaws in position to cooperate with a closing roller 43 on the actuating slide 39. When the filament wire puller is in its forward position, with the gripping jaws 38 open and ready to seize the end of the filament wire, the actuating slide begins to move backward from its advanced position on the head G. During this retreat of the actuating slide the head G remains stationary in its forward position until the movement of the actuating slide 39 on the head G brings it to its rear position on the head with the closing roller 43 between the closing inclines 42, thereby closing the gripping jaws firmly on the end of the filament wire D, as shown in Figure 11, the gripping jaws remaining closed as long as the actuating slide 39 remains in its rear position on the head G. Further backward movement of the actuating slide 39 not only keeps the gripping jaws 38 closed on the filament wire, but also pulls the head G along with it, thereby pulling the filament wire thru the guide E. When the head G has retreated to the limit of its backward movement the filament gripping jaws are opened, as shown in Figure 12, in response to an advance of the actuating slide 39 on the head G while the head is stationary in its rearmost position. This advance of the actuating slide 39 on the temporarily stationary head G moves the jaw closing roller 42 out from between the handles of the gripping jaws and also causes jaw opening pins 44 mounted on the actuating slide 39 to engage inclines 45 on the handles of the gripping jaws and bring the handles together, thereby opening the jaws and releasing the filament wire.

The filament wire puller is reciprocated thru the actuating slide 39 by a pivoted actuating lever 46 having on its end a cam roller 47, shown in dotted lines in Figures 11 and 12, which fits into the groove of a grooved filament cam 48 on the cam shaft 20. As best shown in Figures 11 and 12, the groove of this cam has a retracting part 49 for moving the actuating slide and the filament wire puller to their extreme rear position, thereby pulling the correct length of filament wire thru the guide E. In the position of the mechanism shown in Figure 11, the cam roller 47 has moved along this part of the cam far enough to cause the actuating slide 39 to retreat on the temporarily stationary head G and to close the gripping jaws 38. Further rotation of the cam will thru the lever 46 exert on the actuating slide a pull which moves the filament puller wire bodily to its rear position, shown in Figure 12. A slight advance of the actuating slide on the head G, produced by the short jaw opening part 50 of the cam is sufficient to open the gripping jaws 38 but not sufficient to move the head G so the parts of the filament wire pulling mechanism are in the position shown in Figure 12, with the jaws 38 open. The mechanism remains in this position while the cam roller 47 is in the straight portion 51 of the cam groove, but when it enters the advancing part 52 of the cam the wire pulling head G, with the jaws 38 open, is moved forward bodily into its forward position where the jaws 38 can seize the projecting end of the filament wire D when they are closed as the cam roller encounters the retracting part 49 of the cam whereupon the mechanism assumes the position shown in Figure 11, ready to pull the filament wire.

Figures 13, 14, 15:
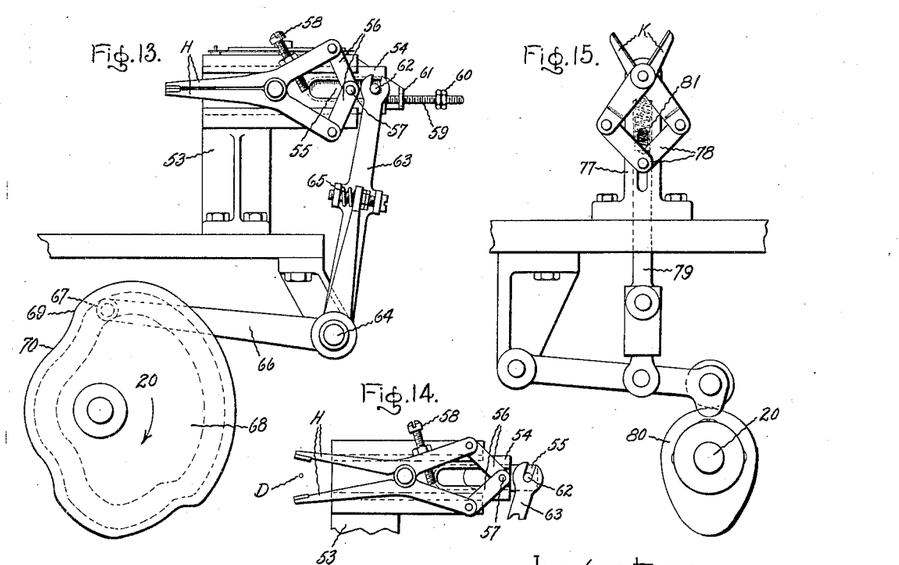
Figures 13 and 14 are side views of the filament carrier.
Figure 15 is a side view of the lead wire cutter.

After the filament wire has been pulled thru the guide E to such an extent that the wire projecting beyond the filament cutter F forms a filament of the desired length, and before the filament puller releases the end of the filament wire the filament mechanism prepares to move the filament bodily toward the leads A by the filament carrier H which seizes the filament at a point between the jaws 38 and the filament cutter F. This filament carrier consists essentially of carrying jaws H mounted in a standard 53, as best shown in Figure 13, for bodily movement transversely of the lead wires. The carrying jaws are pivoted on a head 54 which reciprocates in a groove in the standard and in which there is slidably mounted an auxiliary slide 55, indicated in Figures 13 and 14 and having a limited movement on the head 54. The pivoted jaws H of the filament carrier are opened and closed as the auxiliary slide 55 moves on the head thru links 56 connected to a pin 57 on the auxiliary slide.

The friction of the auxiliary slide in its groove in the head 54 is less than the friction of the head 54 in its groove in the standard 53 and therefore forward movement of the auxiliary slide closes the carrier jaws H and backward movement opens them before the movement of the slide is imparted to the head. The opening of the carrier jaws is limited by a set screw 58 in one of the jaws and the forward movement of the head 54 is limited by an adjustable stop such as a threaded stud 59 projecting from the rear of the head and provided with a stop nut 60 which encounters a stop 61 on the standard 53 when the head is at the limit of its forward movement.

The filament carrier head 54 is moved to and fro by this auxiliary slide 55 which has a pin 62 engaged by an actuating lever 63 mounted on a pivot 64. The lever 63 is preferably swung on its pivot thru a yielding connection such as a spring 65 by a bell crank lever 66 oscillated about the pivot 64 by a cam roller 67 which fits into a groove in the side of a grooved cam 68 on the cam shaft 20. The spring 65 permits the bell crank 66 to over-travel slightly in a counter-clockwise direction as it moves the filament carrier forward because the spring 65 yields when the stop nut 60 on the head 54 encounters the stop 61.

When the filament carrier has been moved to its rear position, shown in Figure 14, by the backward movement of the auxiliary slide the carrier jaws are open to such an extent that the filament pulling jaws 38 can pass between them on the forward movement of the filament puller G to reach the end of the filament wire at the filament cutter F, so that when the filament wire is pulled out the necessary distance it is between the carrier jaws, as shown in Figure 14, and will be seized by them when they close. The width of the carrier jaws is less than the length of the filament, so that the ends of the filament held in these jaws project on each side of the jaws.

When the filament carrier is in the rear position shown in Figure 14 the rotation of the cam 68 brings the cam roller 67 into the jaw closing part 69 of the groove, causing a slight advance of the auxiliary slide 55 from its position in Figure 14 to that in Figure 13, and thereby closing the carrier jaws upon the filament before the head 54 moves forward at all. Further forward movement of the auxiliary slide 55, due to the cam roller 67 entering the carrier advancing part 70 of the groove in the cam 68, carries the head 54 along with the auxiliary slide 55, with the carrier jaws firmly closed on the filament D.

After the filament has been seized by the closing of the carrier jaws H as indicated in Fig. 13 and before the carrier begins its bodily movement forward, the filament cutter F is actuated to cut a filament of predetermined length from the filament wire D and the filament pulling jaws 38 open, thereby releasing the filament held in the carrier jaws H. The filament is then carried by the filament carrier H bodily into a filament fastener and forward into contact with the ends of the lead wire, as indicated in Figure 6, where it rests on the flattened sides of those lead wires with its ends slightly overlapping the ends of the lead wires. The filament mechanism and the lead positioning mechanism above described constitute an assembling mechanism which places a filament of predetermined length on the lead wires in a filament fastener which then secures the ends of the leads.

Figure 17:
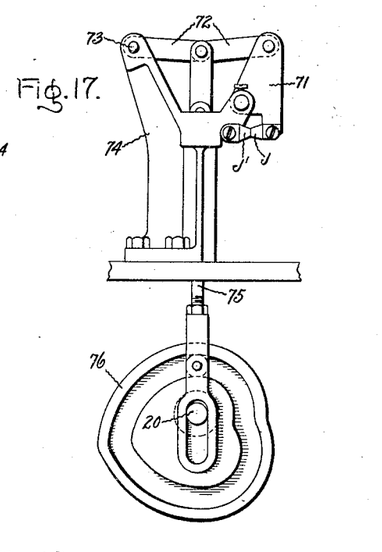
Figure 17 is a side view of the clamper for fastening the filament to the lead wire.

A filament fastener which I have found suitable for this machine comprises two pairs of clamping jaws, each pair consisting of a movable jaw J and a cooperating stationary jaw J'. When the assembling mechanism has positioned the filament and the lead wires the clamping jaws J J' close and fasten the ends of the lead wires to the overlapping ends of the filament by pressing or clamping the ends of the hard filament into the ends of the softer lead wires which rest upon the stationary clamping jaws J'. As best shown in Fig. 17, the movable clamping jaws J of the fastener are mounted on a pivoted rocking arm 71 actuated by a clamping toggle 72 pivoted at one end to the rock arm 71 and at the other end to a stationary pivot 73 in the clamping standard 74. The toggle is straightened to close the clamping jaws by a toggle rod 75 driven from a clamping cam 76 on the cam shaft 20. The parts are so proportioned that the rock arm 71 is swung about its pivot to open the clamping jaws to such an extent that the movable jaws J are swung out of the way of the filament in the forwardly moving carrier H which carries the filament under the movable clamping jaw and lays it on the ends of the lead wires resting on the stationary clamping jaws.

The filament is clamped into the lead wires by the filament fastener while held in place on the ends of the lead wires by the filament carrier in its forward position, as indicated in Figure 6, as a result of the closing of the clamping jaws J, J', as indicated in Figure 7, due to the straightening of the clamping toggle 72 by the upward movement of the toggle rod 75, thereby producing a slow but powerful clamping of the filament into the lead wires. After this is done, and while the clamping jaws are closed, the lead wire heads B move backward along the lead wires, which are firmly held in the clamping jaws, until the heads are in the positions shown in Figures 1 and 8, out of the way of the lead wire cutters K. In the particular form of machine shown these lead wire cutters are shears pivoted on a suitable standard 77 and actuated thru toggle links 78 connected to the ends of the shear blades and also to an actuating rod 79 driven from the cam 80 on the cam shaft 20. In the preferred construction, as indicated in the drawing, and particularly in Figure 15, the lead wire cutters are opened by a coiled spring 81 preferably mounted in the standard 77. The parts are so proportioned that the lead wire cutters K open wide enough to permit the lead wire heads B to pass thru them and are closed by the toggle links 78 so as to cut the lead wires when the heads B are back out of the way.

After the lead wires have been cut as above described, and while the clamping jaws are still closed, the filament carrier releases the filament and moves back out of the way into its rear position, shown in Fig. 14. This result is due to the auxiliary slide 55, to which the cam 68 imparts a backward movement, the initial part of which moves the auxiliary slide 55 on the stationary head 54 and brings the slide and the head into the same relative position as shown in Figure 14, thereby opening the carrier jaws H while the carrier is in its forward position. Further backward movement of the slide carries the head, with all the parts on it maintaining the same relative position, back to its rear position. The clamping jaws open after the carrier jaws have opened and are back out of the way, whereupon the finished filament, as shown in Figure 9, with one short lead and one long lead, is dropped out of the machine as the clamping jaws open. By this time the cam shaft 20 has completed one revolution and the machine has gone thru one cycle of operation and the parts are in the initial position ready to repeat the operation on the next cycle.

The operation of the machine will be clear from the foregoing description and consists essentially of carrying out automatically the steps indicated diagrammatically in Figures 1 to 8 inclusive in the sequence which has just been described. The timing of the various mechanisms is such that while the inner ends of the lead wires are being brought into position the filament wire is being drawn thru the guide E and is being cut off to form a filament of the proper length, which is seized by the filament carrier H before it is cut off and before it is released by the filament pulling jaws but which, when cut off and when released by those jaws, is carried forward by the filament carrier and placed in position to bridge the gap between the adjacent ends of the lead wires. During this movement of the filament into contact with the lead wires the movable clamping jaws J are swung back out of the way, but begin their movement toward the stationary clamping jaws as soon as the filament in the carrier H has passed them on its way to its position on the ends of the lead wires. While the carrier H is in its forward position, and is holding the filament in place, the clamping jaws J close, thereby firmly attaching the filament to the lead wires, after which the filament carrier releases the filament, the lead wire heads B return to their original position, and the lead wires are cut by the lead wire cutters K, whereupon the clamping jaws are opened and the finished filament shown in Fig. 9 drops out of the machine.

What I claim as new and desire to secure by Letters Patent of the United States, is:—

1. The method of making a filament which consists in positioning the end portions of two leads in alignment with their adjacent ends spaced a predetermined distance apart, placing a straight filament longer than the space between the ends of said leads upon said leads to join said leads and overlap the ends thereof and securing the ends of said filament to said leads thereby producing a filament of exposed length equal to the distance between the ends of said leads.

2. The method of making a filament which consists in assembling a straight filament and two leads in alignment with a predetermined space less than the length of said filament between the adjacent ends of said leads and with the ends of said leads and of said straight filament overlapping, and securing the ends of said filament to the adjacent ends of said leads.

3. The method of making a filament which consists in spacing the adjacent ends of aligned leads at a predetermined distance apart, cutting off from a long filament wire a straight filament longer than the distance between the adjacent ends of said lead wires, placing said straight filament on said leads with its ends overlapping the adjacent ends of said leads, clamping said filament into said leads, and cutting said leads adjacent the ends of said filament.

4. The method of making a filament having heavy leads extending from its ends which consists in assembling a straight filament with two long lead wires positioned in substantial alignment with said filament and with their adjacent ends spaced apart a distance somewhat less than the length of said filament and overlapping the ends of said filament, clamping said overlapping ends to join the filament to said lead wires, and cutting said lead wires adjacent the ends of said filament.

5. In a machine of the character described the combination of lead positioning mechanism for placing two leads in alignment with their adjacent ends spaced a predetermined distance apart, a filament mechanism for placing a straight filament on said leads with its ends overlapping the ends of the spaced leads, a fastener for joining said overlapping ends, and driving means for actuating said mechanism and said fastener in sequence.

6. In a machine of the character described, the combination of positioning mechanism for placing long lead wires in alignment with their end portions in alignment and their adjacent ends a predetermined distance apart, a filament mechanism comprising a carrier bodily movable transversely of said lead wires to place a filament on the ends of said lead wires, a fastener for joining the ends of a filament in said carrier to the ends of said lead wires, lead wire cutters mounted to cut said lead wires adjacent the ends of said filament, and common driving means for actuating said mechanism, said fastener and said cutters in sequence.

7. In a machine of the character described the combination of two pairs of clamping jaws mounted side by side, a positioning mechanism for positioning the ends of two leads, one in each pair of said jaws, and at a predetermined distance from each other, a filament mechanism for placing a straight filament in position to bridge the gap between the ends of said leads with its ends in said jaws and overlapping said leads, and driving means for actuating said mechanisms while said jaws are open and for closing said jaws, while said leads and said filaments are in position in said jaws.

8. In a machine of the character described, the combination with a fastener for joining the ends of a filament to leads, and a filament mechanism for placing a filament in operative relation to said fastener, of lead positioning mechanism for placing the end portions of two leads in alignment in said fastener with a predetermined space between the adjacent ends of said leads comprising relatively movable heads mounted to move toward and away from each other adjacent said fastener and having wire clutches operative during the approach of said heads and inoperative during their reverse movement, whereby said heads carry said leads with them as they move toward each other and place the ends of said leads in position and release said leads and leave them stationary as said heads separate.

9. In a machine of the character described, the combination with a fastener for joining ends of a filament to leads, and a filament mechanism for placing a filament in operative relation to said fastener, of reciprocating heads mounted to approach toward and retreat from each other along a path adjoining said fastener to place end portions of two leads in alignment in said fastener in contact with and overlapping the ends of said filament and with a pre-determined space between their adjacent ends and to hold said leads in place during operation of said fastener to join said overlapping ends.

10. In a machine of the character described, the combination with a fastener for joining ends of a filament to leads, and a filament mechanism for placing a filament in operative relation to said fastener, of two heads mounted to reciprocate toward and away from each other in alignment and adjacent said fastener and having clutches operative only during the advance of said heads to grip a wire to carry the end portions of two leads along in alignment as said heads approach each other until the ends of said leads are in said fastener and overlap the ends of said filament with a pre-determined space between their ends, said clutches being rendered inoperative by reverse movement of said heads and thereby leaving said leads in position while said fastener is actuated to join said overlapping ends.

11. In a machine of the character described, the combination with a fastener for joining ends of a filament to leads, and a filament mechanism for placing a filament in operative relation to said fastener, of lead positioning mechanism comprising two heads mounted adjacent said fastener to reciprocate in alignment with each other and to feed two leads toward each other to place them in alignment with their adjacent ends a predetermined distance apart, a clutch on each head to grip the lead in said head and thereby carry the lead along with said head to a predetermined position as said heads approach each other and to release said lead during the separation of said heads and thereby leave said leads in alignment and with their ends spaced a predetermined distance apart, and positioned in said fastener to overlap the ends of said filament.

12. In a machine of the character described the combination with a positioning mechanism for positioning two leads with their ends adjacent and at a predetermined distance apart, and a fastener mounted to cooperate with the ends of said leads when positioned in said fastener by said positioning mechanism, of a filament carrier comprising a pair of cooperating carrier jaws having a width less than the length of a straight filament for seizing a filament near the middle thereof and bodily movable toward said fastener to carry the filament in said jaws into said fastener and place it in contact with said leads to bridge the gap between the ends of said leads with the ends of said filament overlapping the ends of said positioned leads.

13. In a machine of the character described the combination with a positioning mechanism for positioning two leads in alignment, and with their ends adjacent and at a predetermined distance apart, and a fastener mounted to cooperate with the ends of said leads when positioned in said fastener by said positioning mechanism, of a filament carrier bodily movable transversely of said leads and comprising a pair of carrier jaws for seizing a straight filament to hold it with its ends projecting on each side of said jaws and to carry said filament while held in said jaws into said fastener and place it with its ends in contact with and overlapping the ends of said positioned leads.

14. In a machine of the character described the combination with a positioning mechanism for positioning two leads with their ends adjacent and at a predetermined distance apart, and a fastener mounted to cooperate with the ends of said leads when positioned in said fastener by said positioning mechanism, of a filament carrier comprising a reciprocating head, an actuating slide mounted to reciprocate in said head, a pair of filament carrier jaws narrower than the space between the ends of said positioned leads and pivoted on said head and connected to said actuating slide to be opened and closed by movement of said slide on said head, and actuating means connected to said actuating slide to move said actuating slide forward to close said carrier jaws and move said head bodily forward until a straight filament in said carrier jaws is placed with its ends in contact with and overlapping the ends of said positioned leads, and to move said actuating slide backward to first open said filament carrier jaws and then move said head bodily backward to its initial position.

15. In a machine of the character described the combination with a filament fastener, lead wire positioning mechanism for holding the end portions of two leads in said fastener in alignment and with a predetermined space between their adjacent ends, and a filament carrier bodily movable transversely of said leads to bring a filament into said fastener with its ends overlapping the adjacent ends of said heads, of a filament former comprising a guide for a long filament wire, means for pulling said filament wire thru said guide a predetermined distance and within range of said filament carrier, and means for cutting said filament wire adjacent said guide to produce a straight filament of predetermined length.

16. In a machine of the character described, the combination with a filament fastener, lead wire positioning mechanism for holding the end portions of two leads in said fastener in alignment and with a predetermined space between their adjacent ends, and a filament carrier bodily movable transversely of said leads to bring a filament into said fastener with its ends overlapping the adjacent ends of said leads, of a filament forming device comprising a guide for a long filament wire, a reciprocating wire puller mounted to advance bodily to said guide and comprising cooperating jaws mounted to overlap the end of the filament wire projecting from said guide and jaw operating means for closing said jaws and holding them closed during the retreat of said wire puller from said guide to pull a predetermined length of filament wire thru the guide and into position to be seized by said carrier, and a filament wire cutter adjacent said guide for cutting said wire to produce a filament of predetermined length.

17. In a machine of the character described, the combination with a filament fastener, lead wire positioning mechanism for holding the end portions of two leads in said fastener in alignment and with a predetermined space between their adjacent ends, and a filament carrier bodily movable transversely of said leads to bring a filament into said fastener with its ends overlapping the adjacent ends of said leads, of a guide for a filament wire, a wire puller mounted to reciprocate with reference to and in alignment with said guide, gripping jaws on said puller for seizing the end of the filament wire projecting from said guide, means for keeping said jaws closed on said filament wire during movement of said puller away from said guide, said wire puller being mounted to bring the filament wire drawn thru said guide into said filament carrier, a filament wire cutter adjacent said guide, and driving means for moving said wire puller away from said guide, and actuating said cutter, said filament carrier and said gripping jaws in sequence to cut the wire drawn thru said guide and to open said gripping jaws after said carrier has seized the filament.

18. In a machine of the character described, the combination with a filament fastener, lead wire positioning mechanism for holding the end portions of two leads in said fastener in alignment and with a predetermined space between their adjacent ends, and a filament carrier bodily movable transversely of said leads to bring a filament into said fastener with its ends overlapping the adjacent ends of said leads, of a filament former comprising a guide for long filament wire, a filament cutter adjacent the end of said guide comprising cooperating rotatable discs, each having a notch, said notches being normally in registry and having edges to act as shear blades, a wire puller constructed to reciprocate in alignment with said guide and to pull the filament wire thru said guide and thru said notches into position to be seized by said filament carrier and driving means for actuating said wire puller, said cutting blades and said filament carrier in sequence to cut off a definite length of filament wire after it is seized by said filament carrier.

19. In a machine of the character described, the combination with two pairs of cooperating clamping jaws mounted side by side, of assembling mechanism for placing in said jaws a straight filament with its ends in said jaws and a lead at each end of said filament overlapping said filament in said jaws to form an extension of said filament at each end thereof and in substantial alignment therewith, and driving means for actuating said assembling mechanism and said clamping jaws in sequence.

20. In a machine of the character described, the combination with two pairs of cooperating clamping jaws mounted side by side, one jaw of each pair being pivoted and a toggle connected to said pivoted jaw to close it on the cooperating jaw as said toggle is straightened, of assembling mechanism for placing in said jaws a straight filament with its ends in said jaws and a lead at each end of said filament overlapping said filament in said jaws to form an extension of said filament at each end thereof and in substantial alignment therewith, and driving means for actuating said assembling mechanism and said clamping jaws in sequence.

21. In a machine of the character described, the combination with two pairs of cooperating clamping jaws mounted side by side and closing means for said jaws constructed to close them with a slow powerful movement, of assembling mechanism for placing in said jaws a straight filament with its ends in said jaws and a lead at each end of said filament overlapping said filament in said jaws to form an extension of said filament at each end thereof and in substantial alignment therewith, and driving means for actuating said assembling mechanism and said clamping jaws in sequence.

In witness whereof, I have hereto set my hand this 9th day of March, 1927.

JOHN FLAWS, Jr.